United States Patent
Koike et al.

(10) Patent No.: US 9,323,674 B2
(45) Date of Patent: Apr. 26, 2016

(54) PROCESSOR, INFORMATION PROCESSING APPARATUS, AND CONTROL METHOD OF PROCESSOR

(71) Applicant: FUJITSU LIMITED, Kawasaki-shi, Kanagawa (JP)

(72) Inventors: Hayato Koike, Kawasaki (JP); Naohiro Kiyota, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 195 days.

(21) Appl. No.: 14/153,112

(22) Filed: Jan. 13, 2014

(65) Prior Publication Data

US 2014/0289480 A1 Sep. 25, 2014

(30) Foreign Application Priority Data

Mar. 22, 2013 (JP) .................................. 2013-060722

(51) Int. Cl.
*G06F 12/08* (2006.01)

(52) U.S. Cl.
CPC ........ *G06F 12/0815* (2013.01); *G06F 12/0804* (2013.01)

(58) Field of Classification Search
None
See application file for complete search history.

(56) References Cited

U.S. PATENT DOCUMENTS

| 5,353,423 A * | 10/1994 | Hamid | G06F 13/1689 711/143 |
| 6,070,232 A * | 5/2000 | Ishida | G06F 11/1407 711/143 |
| 2003/0056062 A1* | 3/2003 | Prabhu | G06F 12/0804 711/143 |
| 2012/0331234 A1* | 12/2012 | Hirao | G06F 12/084 711/135 |
| 2013/0339626 A1* | 12/2013 | Alexander | G06F 12/0855 711/143 |

FOREIGN PATENT DOCUMENTS

| JP | 08-083215 | 3/1996 |
| JP | 11-282750 | 10/1999 |

* cited by examiner

*Primary Examiner* — Gary Portka
(74) *Attorney, Agent, or Firm* — Fujitsu Patent Center

(57) ABSTRACT

A processor includes: a primary cache memory; an instruction control unit that issues a store request to the primary cache memory; a pipeline processing unit that, upon receiving the store request, writes data to the primary cache memory; a buffer unit that obtains an address output to the primary cache memory from the pipeline processing unit during an output period of the store request regarding certain data to hold the obtained address in an entry, and when the output period ends, issues a write-back request for writing the data indicated by the address held in the entry to a memory; and a secondary cache memory that, upon receiving the write-back request from the buffer unit, writes the data of the primary cache memory to the memory, the certain data is quickly written back to the memory from the primary cache memory.

10 Claims, 13 Drawing Sheets

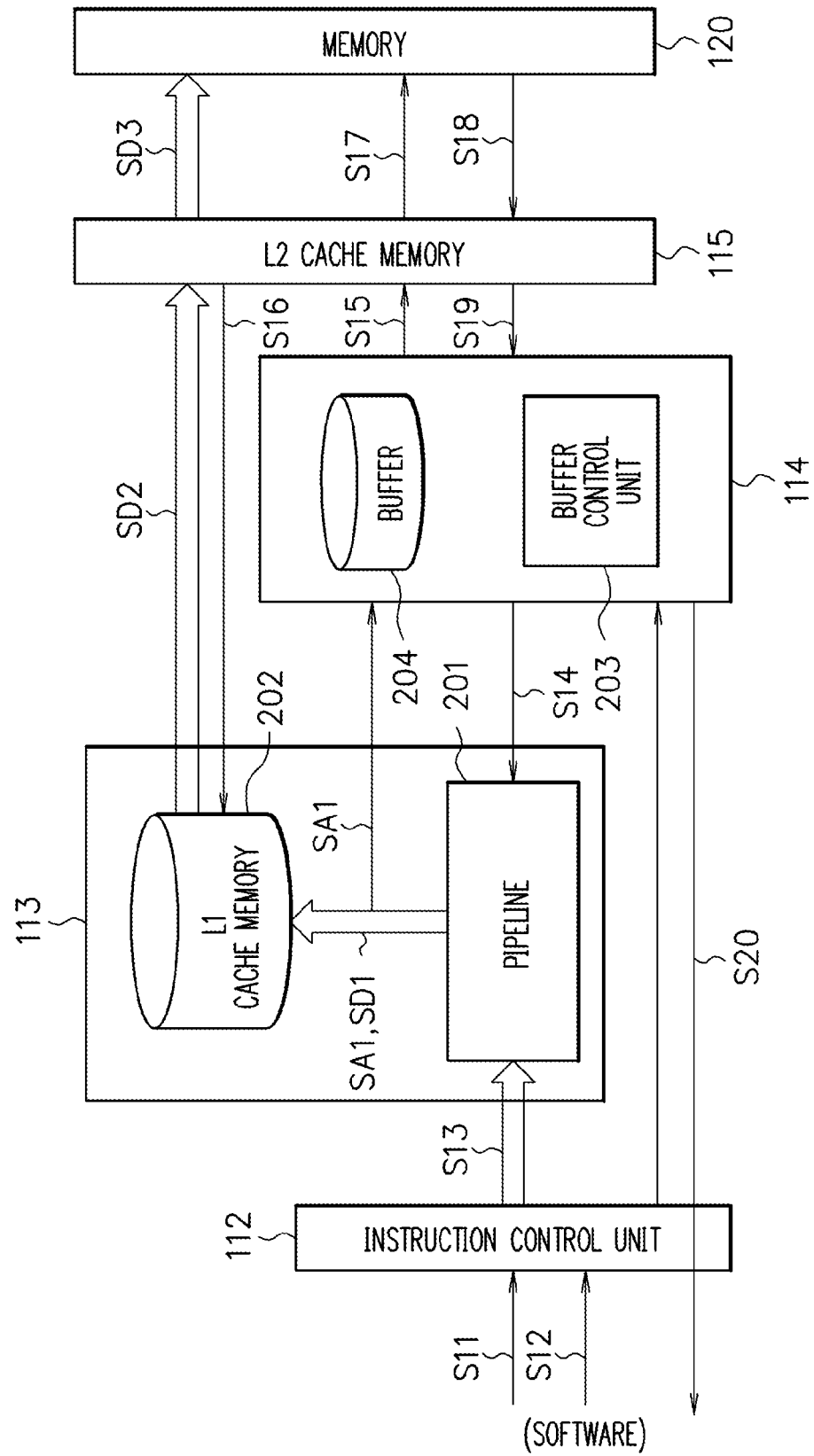

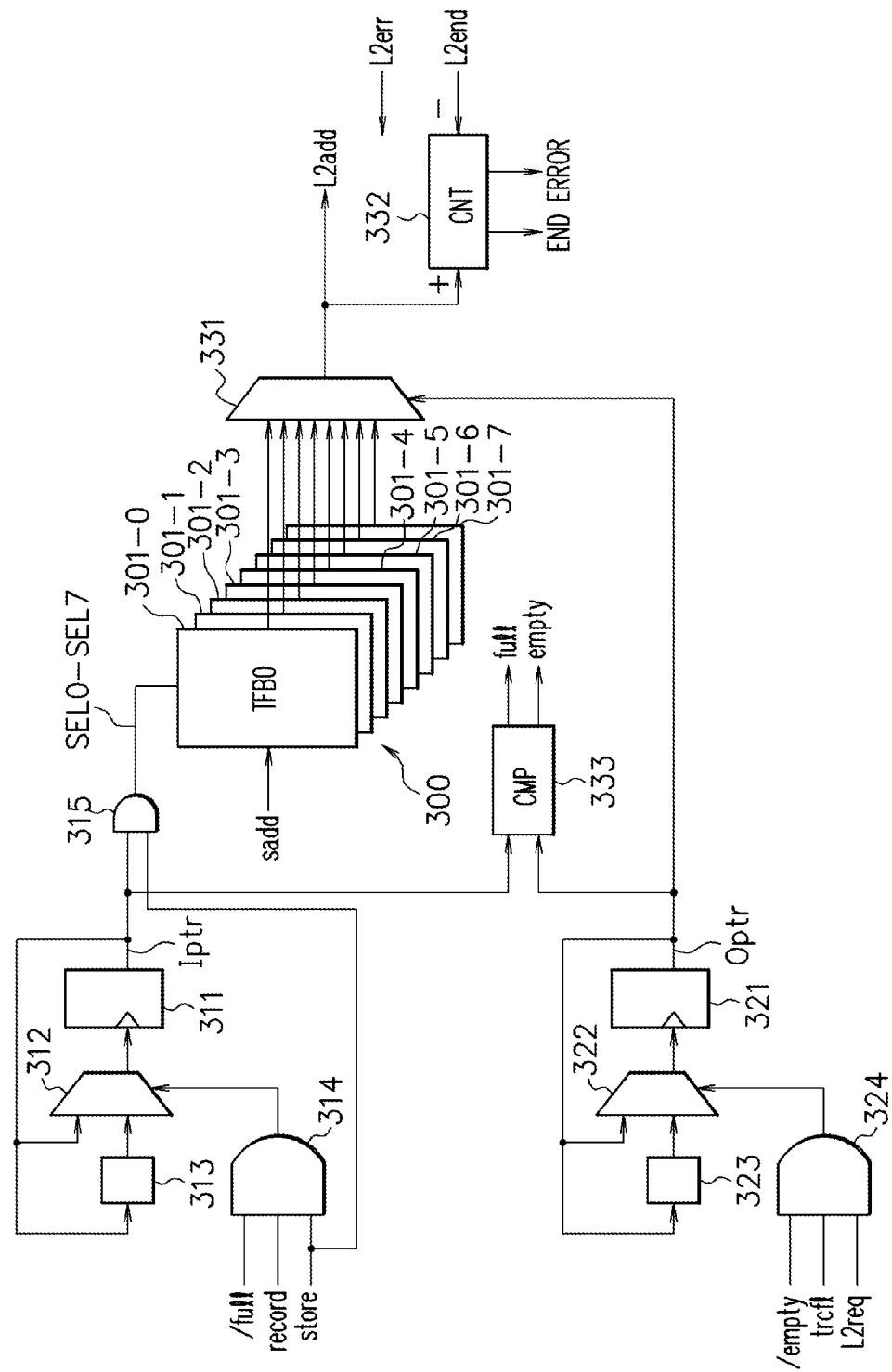

F I G. 4A
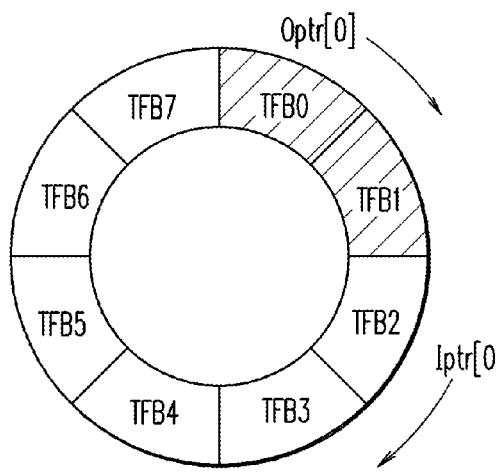
F I G. 4B
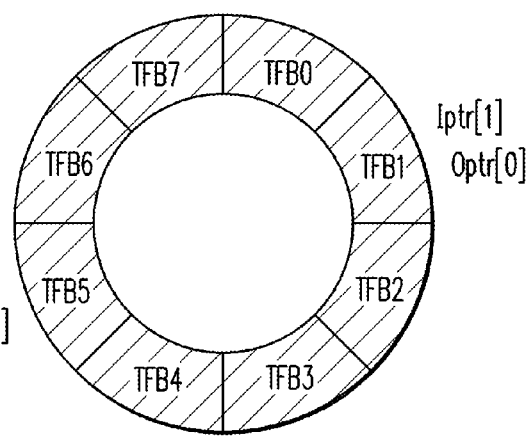
F I G. 4C
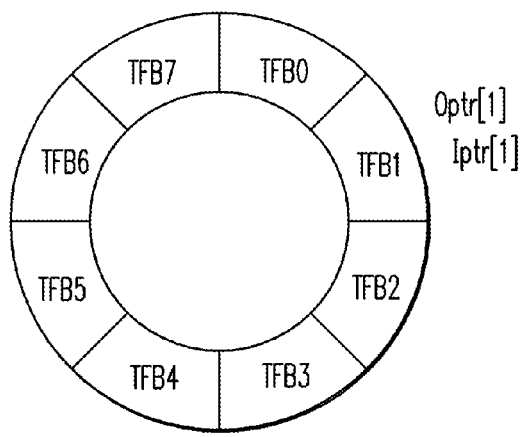
F I G. 5
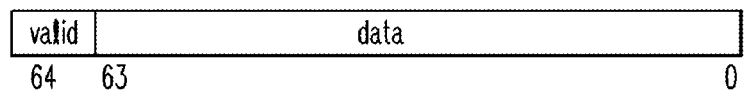

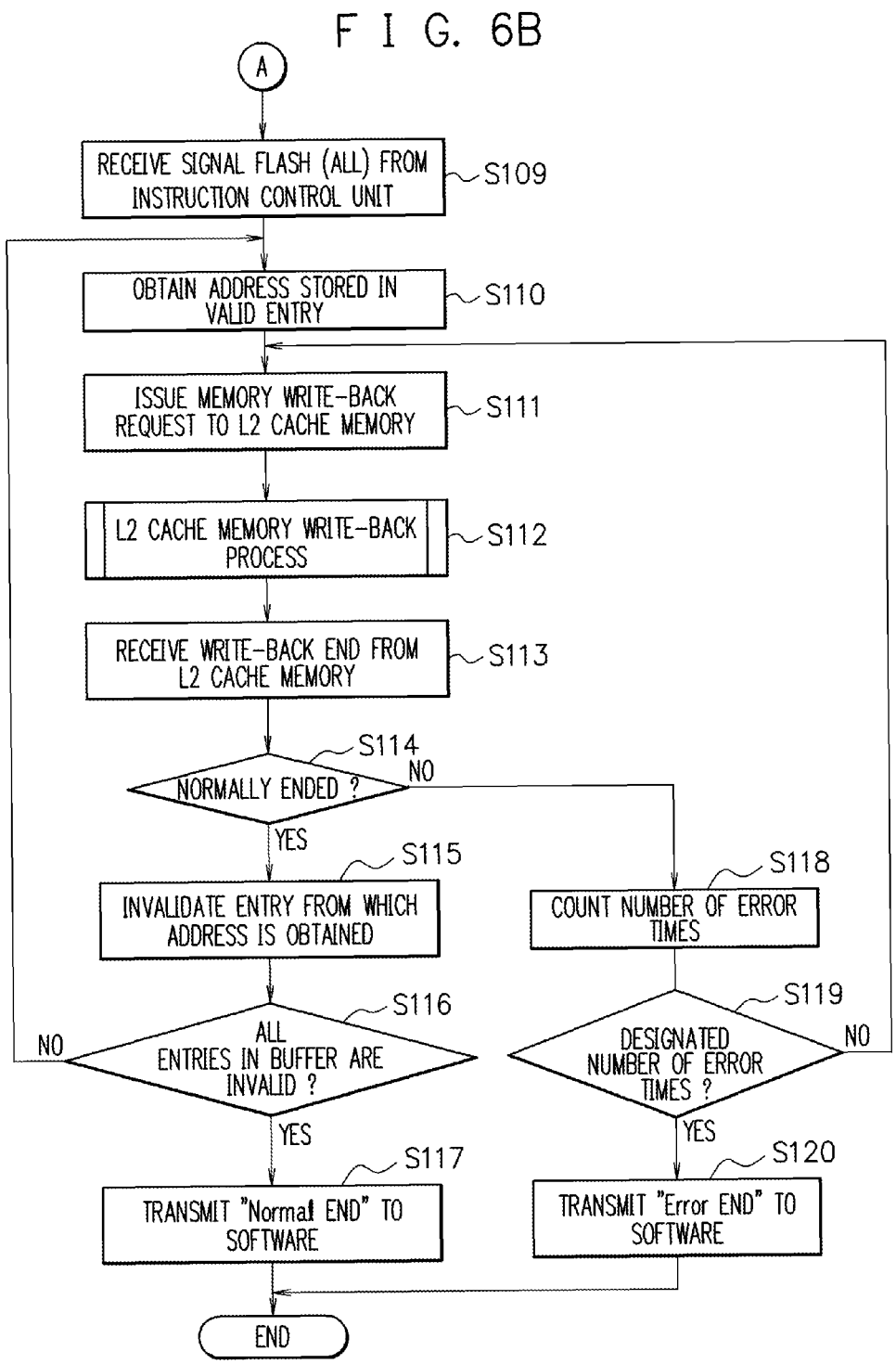

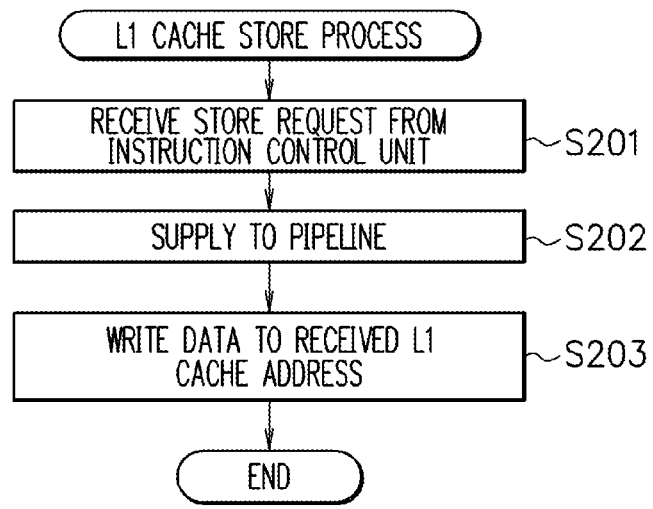
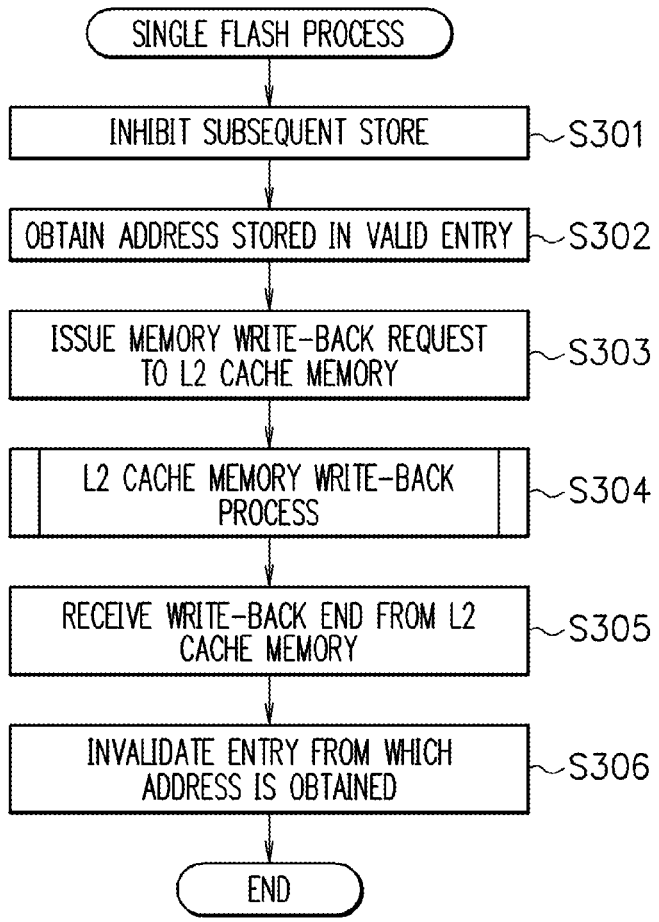

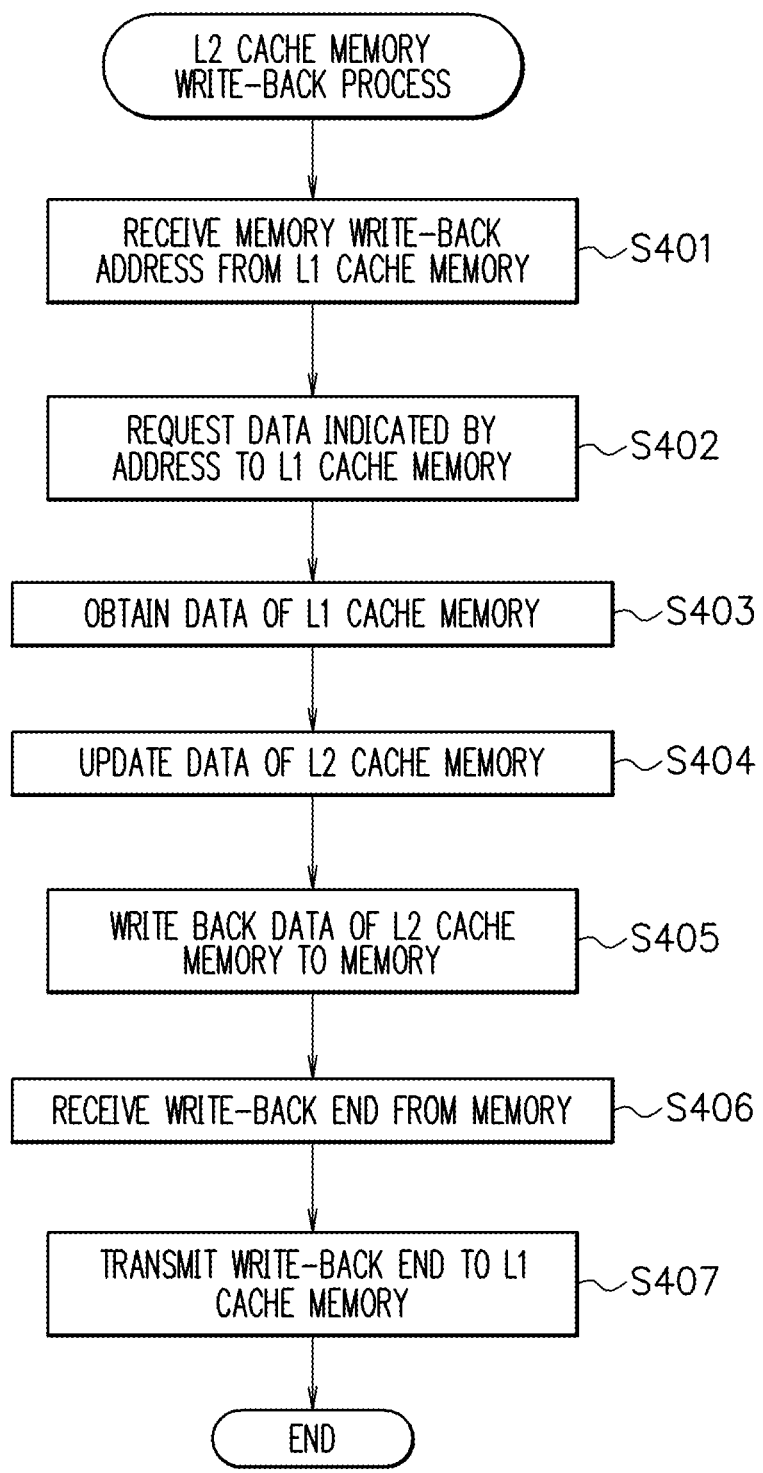

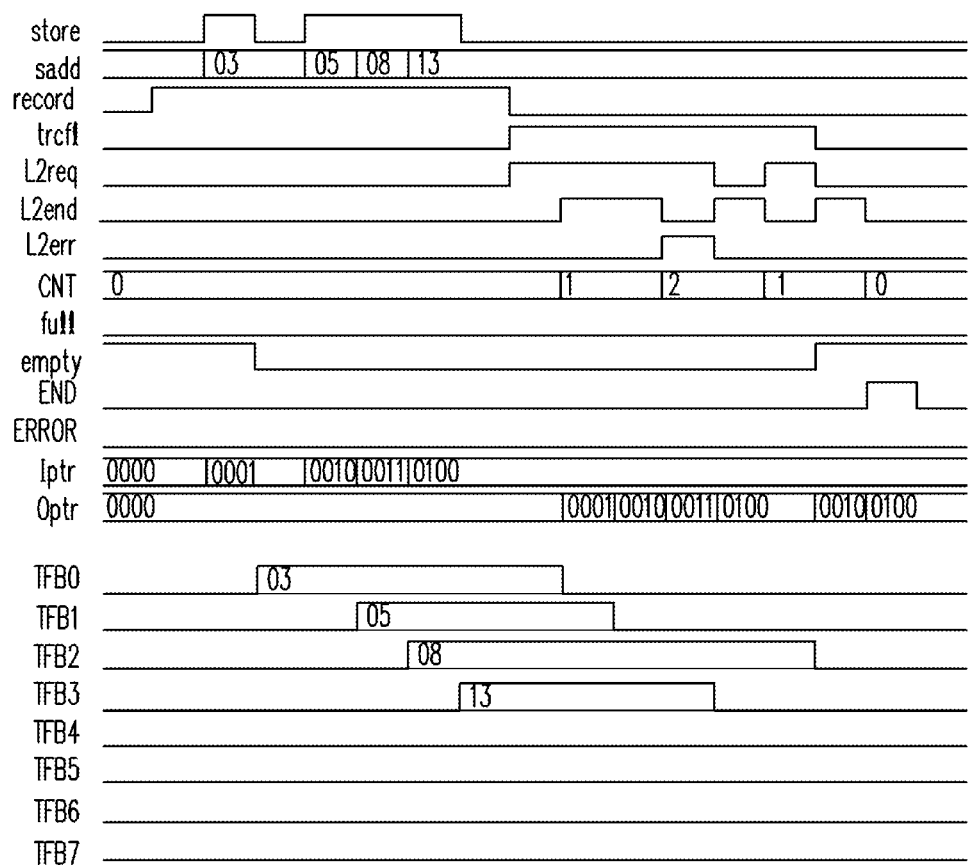
F I G. 13

PROCESSOR, INFORMATION PROCESSING APPARATUS, AND CONTROL METHOD OF PROCESSOR

CROSS-REFERENCE TO RELATED APPLICATION

This application is based upon and claims the benefit of priority of the prior Japanese Patent Application No. 2013-060722, filed on Mar. 22, 2013, the entire contents of which are incorporated herein by reference.

FIELD

The embodiments discussed herein are directed to a processor, an information processing apparatus, and a control method of a processor.

BACKGROUND

Information processing apparatus including a large number of CPUs (Central Processing Units) such as large-scale servers are increasing. In the apparatus including the many CPUs, communication between the CPUs occur in a data read to a certain CPU from a memory involved in another CPU and a data write from a certain CPU to a memory involved in another CPU, which becomes a factor of lowing performance. In order to remedy the performance deterioration, there has been proposed shared memory technology in which a plurality of CPUs uses the same memory as a main storage.

Methods to write data from a cache memory of a CPU to a memory being a main storage include a write-back method and a write-through method. The write-back method is capable of executing a memory access at a high speed though sometimes temporarily impairing consistency of data between the cache memory and the main storage. The write-through method is capable of constantly keeping consistency of data between the cache memory and the main storage, but on the other hand, has a difficulty in executing a memory access at a high speed.

There has been proposed an apparatus that controls whether to execute a data write from a cache memory to a memory being a main storage by the write-back method or the write-through method. For example, there has been proposed an apparatus that performs the control according to an access address so that a data write is executed by the write-back method for a certain area requiring a high-speed access and a data write is executed by the write-through method for a certain area requiring consistency of data (for example, refer to Patent Document 1). There has also been proposed an apparatus that controls whether to execute a data write by the write-back method or by the write-through method, according to tag information of a data block stored in a cache line, for instance (for example, refer to Patent Document 2).

[Patent Document 1] Japanese Laid-open Patent Publication No. 08-83215
[Patent Document 2] Japanese Laid-open Patent Publication No. 11-282750

In a shared memory environment, a plurality of CPUs are capable of using the same memory, and performance deterioration due to the occurrence of the communication between the CPUs may be suppressed. Writing data from a cache memory of a CPU to a memory being a main storage by the write-back method enables the execution of a memory access at a high speed.

However, in the shared memory environment, when data are written from the cache memory to the memory being the main storage by the write-back method, some data is held in the cache memory for a long period before being written back to the memory. Accordingly, when some CPU fails, if the write of the data to the common memory from the cache memory of this CPU is not completed, the plural CPUs are influenced and the whole information processing apparatus sometimes stops.

SUMMARY

According to an aspect of the embodiments, a processor includes: an instruction control unit that issues a store request to a cache memory of the processor and outputs a first signal indicating an output period of the store request regarding certain data; a first write processing unit that, upon receiving the store request from the instruction control unit, outputs an address and the data of the store request to the cache memory to write the data to the cache memory; a buffer unit; and a second write processing unit that, upon receiving a write-back request from the buffer unit, writes the data of the cache memory corresponding to the write-back request to a main storage. During the output period of the store request regarding the certain data, the buffer unit obtains the address output to the cache memory from the first write processing unit to hold the obtained address in an entry, and when the output period ends, issues the write-back request for writing the data indicated by the address held in the entry to the main storage.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a configuration involved in a store process of the information processing apparatus in this embodiment;
FIG. 3 is a diagram illustrating a configuration example of a buffer unit in this embodiment;
FIG. 4A, FIG. 4B and FIG. 4C are explanatory charts of a buffer in this embodiment;
FIG. 5 is a chart illustrating an example of information stored in the buffer in this embodiment;
FIG. 6A and FIG. 6B are flowcharts illustrating an example of a trace flash process in this embodiment;
FIG. 7 is a flowchart illustrating an example of a cache store process in this embodiment;
FIG. 8 is a flowchart illustrating an example of a single flash process in this embodiment;
FIG. 9 is a flowchart illustrating an example of a memory write-back process in this embodiment;
FIG. 12, FIG. 13 and FIG. 14 are timing charts illustrating an operation example of the buffer unit in this embodiment.

DESCRIPTION OF EMBODIMENTS

Hereinafter, embodiments will be described with reference to the drawings.

Figure 1:
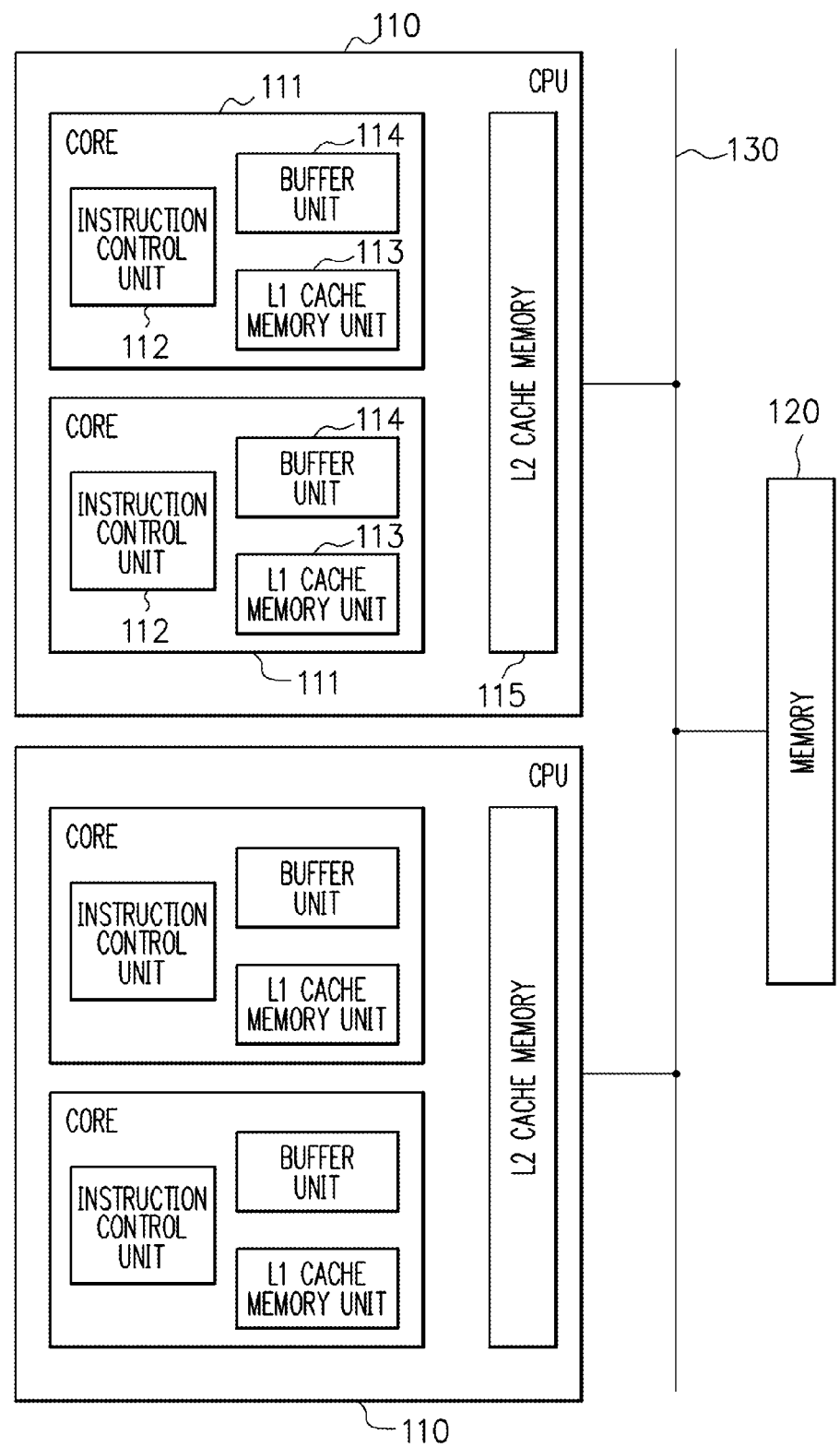
FIG. 1 is a diagram illustrating a configuration example of an information processing apparatus including processors in an embodiment.

FIG. 1 is a block diagram illustrating a configuration example of an information processing apparatus including CPUs (Central Processing Units) as processors in an embodiment. The information processing apparatus in this embodiment employs shared memory technology in which a plurality of CPUs use the same memory as a main storage. A plurality of CPUs 110 and a memory 120 as the main storage are connected via a bus 130. The information processing apparatus in this embodiment writes data from cache memories of the CPUs 110 to the memory 120 as the main storage by a write-back method.

As previously described, when data are written from the cache memories to the memory being the main storage by the write-back method, some data is held in the cache memory for a long period before being written back to the memory. Accordingly, in the share memory environment, when some CPU fails, if the write-back of the data to the common memory from the cache memory of this CPU is not completed, the plural CPUs are influenced, and the whole information processing apparatus sometimes stops. Therefore, in the information processing apparatus in this embodiment, the write-back of data held in the cache memories to the common memory is generally executed by the write-back method, and when necessary, the write-back may be executed quickly by a process which is called a trace flash process in this embodiment.

The CPUs 110 each include cores 111 and a secondary (L2 (Level-2)) cache memory 115 which holds a data block stored in the memory 120 being the main storage. In each of the CPUs 110 in this embodiment, the two cores 111 share the secondary cache memory 115. FIG. 1 illustrates an example where the CPUs 110 each include the two cores 111, but the number of the cores 111 that the CPU 110 includes is arbitrary. Alternatively, the secondary cache memory 115 may be provided for each of the cores 111.

The cores 111 each include an instruction control unit 112, a primary (L1 (Level-1)) cache memory unit 113, and a buffer unit 114. The instruction control unit 112 interprets an instruction read from the main storage or the like to issue various kinds of processing requests. The processing requests issued by the instruction control unit 112 include a store request for writing data, a load request for reading data, an arithmetic processing request to functional units such as a not-shown arithmetic unit, and so on. The primary cache memory unit 113 holds data used at the time of the execution of processing, data of processing results, and so on. The buffer unit 114 obtains and holds information (address indicating a write destination, and so on) involved in the trace flash process, and controls the execution of the trace flash process.

FIG. 2 is a diagram illustrating a configuration example of the information processing apparatus in this embodiment, and illustrates a configuration involved in a store process (including the trace flash process) in which data are written to the memory 120. In FIG. 2, the same constituent elements as the constituent elements illustrated in FIG. 1 are denoted by the same reference signs.

Upon receiving a store instruction S11 of data from software (program side), the instruction control unit 112 issues a store request S13 to the primary cache memory unit 113. The instruction control unit 112 receives, from the software, information S12 indicating whether or not a present time is a period when to execute the store instruction S11 for certain data that is to be written by the trace flash process and controls signals REC, FLASH that it outputs according to the information S12. The certain data that are to be written by the trace flash process include data shared by the plural CPUs, application software, or the like, and for example, include data in a data base used in data base software.

When the information S12 indicates the period when to execute the store instruction S11 for the certain data that is to be written by the trace flash process, the instruction control unit 112 asserts the signal REC indicating that the present time is an output period of the store request regarding the certain data (set the signal REC to high level ("1") in this example). Further, when negating the asserted signal REC, the instruction control unit 112 asserts the signal FLASH in a pulse form (set the signal FLASH to high level ("1") in this example).

That is, the instruction control unit 112 asserts the negated signal REC when the store process of data being objects of the trace flash process is started. The instruction control unit 112 negates the asserted signal REC when the store process of the data being the objects of the trace flash process is finished. The instruction control unit 112 asserts the signal FLASH in the pulse form when the store process of the data being the objects of the trace flash process is finished and a write-back of the data to the memory by the trace flash process is caused to start.

The primary cache memory unit 113 includes a pipeline processing unit 201 and a primary (L1 (Level-1)) cache memory 202. The pipeline processing unit 201 as a first write processing unit executes a cache store process for writing the data to the primary cache memory 202, according to the store request S13 from the instruction control unit 112. In the cache store process, the pipeline processing unit 201 outputs, to the primary cache memory 202, data SD1 whose store is requested and an address SA1 indicating a write destination. The primary cache memory 202 registers and holds the data SD1 and tag information in an area (entry) corresponding to the address SA1 designated by the store request.

The buffer unit 114 includes a buffer control unit 203 and a buffer 204. The buffer control unit 203 performs control regarding the trace flash process. When the signal REC is asserted, the buffer control unit 203 obtains the address SA1 of the store request output from the pipeline processing unit 201 to the primary cache memory 202 in the primary cache memory unit 113 and registers and holds the address SA1 in an entry in the buffer 204. The buffer 204 includes a plurality of entries where to register the address SA1 of the store request.

When no vacancy is left in the entries in the buffer 204, that is, when all the entries become valid, the buffer control unit 203 outputs a store inhibition signal S14 for stopping the processing to the pipeline processing unit 201 in the primary cache memory unit 113. When the signal FLASH is asserted or when all the entries in the buffer 204 become valid, the buffer control unit 203 issues a memory write-back request S15 to the secondary cache memory 115.

The secondary cache memory 115 as a second write processing unit writes back (writes) data to the memory 120 when receiving the memory write-back request. The secondary cache memory 115 issues, to the primary cache memory 202, an acquisition request S16 of data indicated by an address designated by the memory write-back request, and receives data SD2 that is transmitted as a response thereto. Then, the secondary cache memory 115 updates the contents of its own memory by the received data SD2, and outputs the data SD2 as write data SD3 to the memory 120 and outputs a memory write-back instruction S17 to the memory 120. Consequently, the data SD3 is written to a storage area in the memory 120 corresponding to the address designated by the memory write-back request.

When the write of the data SD3 to the memory 120 is completed, the memory 120 notifies a write-back end S18 to the secondary cache memory 115. Upon notified of the write-back end S18 from the memory 120, the secondary cache memory 115 notifies the write-back end to the primary cache memory 202. Here, in the case where the secondary cache memory 115 receives the memory write-back request S15 from the buffer unit 114, the secondary cache memory 115 further notifies a write-back end S19 to the buffer unit 114 when notified of the write-back end S18 from the memory 120. Then, the buffer unit 114 notified of the write-back end S19 notifies a trace flash process end S20 to the software.

FIG. 3 is a diagram illustrating a configuration example of the buffer unit 114 in this embodiment. The buffer unit 114 includes a buffer 300, storage circuits 311, 321, selectors 312, 322, adder circuits 313, 323, logical product operation circuits (AND circuits) 314, 315, 324, a selector 331, a counter 332, and a comparator circuit 333.

The buffer 300 holds one or more addresses indicating a write destination of certain data which is to be written by the trace flash process. The buffer 300 includes a plurality of entries (TFB) 301-0 to 301-7. In each of the entries (TFB) 301-1 to 301-7, there are stored a valid bit (valid) indicating whether information in the entry is valid or invalid and an address (data) of the store request, as illustrated in FIG. 5 as an example. Values of the entries (TFB) 301-0 to 301-7 are updated by a signal sadd that is input thereto when corresponding control signals SEL0 to SEL7 are asserted, and values are not stored therein when the corresponding control signals SEL0 to SEL7 are negated. The signal sadd is an address signal indicating an address of the store request. FIG. 3 illustrates, as an example, the buffer 300 including the eight entries (TFB) 301-0 to 301-7, but the number of the entries is arbitrary.

The storage circuit 311 stores and outputs a signal Iptr indicating the number assigned to a storage destination entry where to store an address of the store request next. The signal Iptr is an input pointer indicating the storage destination entry, and in this embodiment, it has four bits, and its less significant three bits indicate the numbers assigned to the entries (TFB) 301-0 to 301-7. The signal Iptr output from the storage circuit 311 is input to the selector 312 and the AND circuit 315 and also input to the selector 312 via the adder circuit 313 which increments a value by 1. In this embodiment, the adder circuit 313 outputs a value "0000b" (b at the end indicates binary notation. The same applies below) when the value of the signal Iptr that is input thereto is "1111b".

The AND circuit 314 receives signals store, record, and /full (/ indicates an inversion signal. The same applies below), and outputs an arithmetic operation result thereof. The signal store is a signal indicating that the cache store process for writing data to the primary cache memory is to be executed. The signal record is the signal REC output from the instruction control unit 112 illustrated in FIG. 2 and is a signal indicating the start and finish of the cache store process for certain data that is to be written by the trace flash process (output period of the cache store process request). The signal full is a signal indicating that all the entries (TFB) 301-0 to 301-7 are valid.

The selector 312 selects one of the output of the storage circuit 311 and the output of the adder circuit 313 according to the output of the AND circuit 314 and outputs the selected output to the storage circuit 311. The selector 312 selects the output of the storage circuit 311 when the output of the AND circuit 314 is "0", and selects the output of the adder circuit 313 when the output of the AND circuit 314 is "1". Therefore, when any of the entries (TFB) 301-0 to 301-7 is not valid and the cache store process of data being the object of the trace flash process is to be executed, the value indicated by the signal Iptr increments by "1", and otherwise, the value indicated by the signal Iptr is held.

The AND circuit 315 receives the signal Iptr output from the storage circuit 311 and the signal store, and outputs an arithmetic operation result thereof as the control signals SEL0 to SEL7. When the signal store is "1", that is, when the cache store process to the primary cache memory is to be executed, the AND circuit 315 asserts one of the control signals SEL0 to SEL 7 according to the less significant three bits of the signal Iptr. When the signal store is "0", that is, when the cache store process is not executed, the AND circuit 315 negates all the control signals SEL0 to SEL7.

Incidentally, a signal indicating whether or not the address of the store request agrees with addresses stored in one or more valid entries (TFB) 301-0 to 301-7 may be input to the AND circuits 314, 315. In this case, when the address of the store request agrees with any of the addresses already stored in one or more valid entries, it is possible to inhibit the address of the store request from being registered in the entries (TFB) 301-0 to 301-7 and to prevent the same address from being registered in the plural entries.

The storage circuit 321 stores and outputs a signal Optr indicating the number assigned to an entry where an address of data that is to be written back to the secondary cache memory next is stored. The signal Optr is an output pointer indicating the entry whose stored address is output next, and in this embodiment, it has four bits, and the less significant three bits indicate the numbers assigned to the entries (TFB) 301-0 to 301-7. The signal Optr output from the storage circuit 321 is input to the selectors 322 and 331 and also input to the selector 322 via the adder circuit 323 which increments a value by 1. In this embodiment, the adder circuit 323 outputs a value "0000b" when the value of the signal Optr that is input thereto is "1111b".

The AND circuit 324 receives signals L2req, trcfl, and /empty and outputs an arithmetic operation result thereof. The signal L2req is a signal indicating that a write-back of data to the secondary cache memory is requested. The signal trcfl is a signal that is asserted when a reason why the signal L2req is output is one of (1) that the signal full is asserted, (2) that the signal record indicates the end of the cache store process for data being objects of the trace flash process, and (3) an instruction by the software. In other words, the signal trcfl is a signal which is asserted when the memory write-back process is requested. The signal empty is a signal indicating that none of the entries (TFB) 301-0 to 301-7 is valid.

The selector 322 selects one of the output of the storage circuit 321 and the output of the adder circuit 323 according to the output of the AND circuit 324 to output the selected output to the storage circuit 321. The selector 322 selects the output of the storage circuit 321 when the output of the AND circuit 324 is "0", and selects the output of the adder circuit 323 when the output of the AND circuit 324 is "1". Therefore, when any of the entries (TFB) 301-0 to 301-7 is valid and the data write-back to the secondary cache memory by the trace flash process is requested, the value indicated by the signal Optr increments by "1", and otherwise, the value indicated by the signal Optr is held.

The selector 331 selects one entry (TFB) out of the entries (TFB) 301-0 to 301-7 according to the signal Optr and outputs the value stored in the selected entry as a signal L2radd. The signal L2radd is an address signal indicating a write destination when the write-back of data to the secondary cache memory by the trace flash process is requested.

The counter 332 increments a count value by 1 when the signal L2radd is output and decrements the count value by 1 when a signal L2end is input in the buffer unit 114. The signal L2end is a signal indicating that the secondary cache memory has normally finished the write-back of data being objects of the trace flash process to the memory. A signal L2err is a signal indicating that the secondary cache memory has erroneously finished the write-back of the data being the objects of the trace flash process to the memory. That is, when the write-back of the data by the trace flash process is normally finished, the count value of the counter 332 becomes 0, and when it is erroneously finished, the count value of the counter 332 does not become 0. Based on the count value, the counter 332 determines whether or not the trace flash process is normally finished or erroneously finished, and outputs a signal END when determining that the trace flash process is normally finished, and outputs a signal ERROR when determining that the trace flash process is erroneously finished.

The comparator circuit 333 compares the signal Iptr output from the storage circuit 311 and the signal Optr output from the storage circuit 321, and outputs signals full, empty based on the comparison result. When data stored in the entry (TFB0) 301-0 and the entry (TFB1) 301-1 are valid as illustrated in FIG. 4A, the value indicated by the signal Iptr is "0010b", and the value indicated by the signal Optr is "0000b". In such a normal state (neither a full state nor an empty state), the comparator circuit 333 negates both of the signals full, empty. Note that in FIG. 4A to FIG. 4C, the signals Iptr, Optr are assumed to progress clockwise, and the values of the most significant bits of the signals Iptr, Optr are given together with the signal names.

Thereafter, the data are sequentially stored in the entry (TFB2) 301-2 to the entry (TFB7) 301-7, and when the signal Iptr makes one round, the value of the most significant bit of the signal Iptr becomes "1b". When, in the state where the value of the most significant bit of the signal Optr is "0b", the numbers assigned to the entries indicated by the signals Iptr, Optr, that is, the values of the less significant three bits of the signals Iptr, Optr are the same, all the entries (TFB) 301-0 to 301-7 become valid as illustrated in FIG. 4B, resulting in the full state. That is, when the values of the most significant bits of the signals Iptr, Optr are different and the values of the less significant three bits thereof are the same, this is the full state and the comparator circuit 333 asserts the signal full.

When the signals Iptr, Optr both make one round, the values of the most significant bits of the signals Iptr, Optr become "1b". When, in the state where the values of the most significant bits of the signals Iptr, Optr are thus the same, the numbers assigned to the entries indicated by the signals Iptr, Optr, that is, the values of the less significant three bits of the signals Iptr, Optr are the same, all the entries (TFB) 301-0 to 301-7 become invalid as illustrated in FIG. 4C, resulting in the empty state. That is, when the values of the signals Iptr, Optr are the same, this is the empty state, and the comparator circuit 333 asserts the signal empty.

Figure 6A:
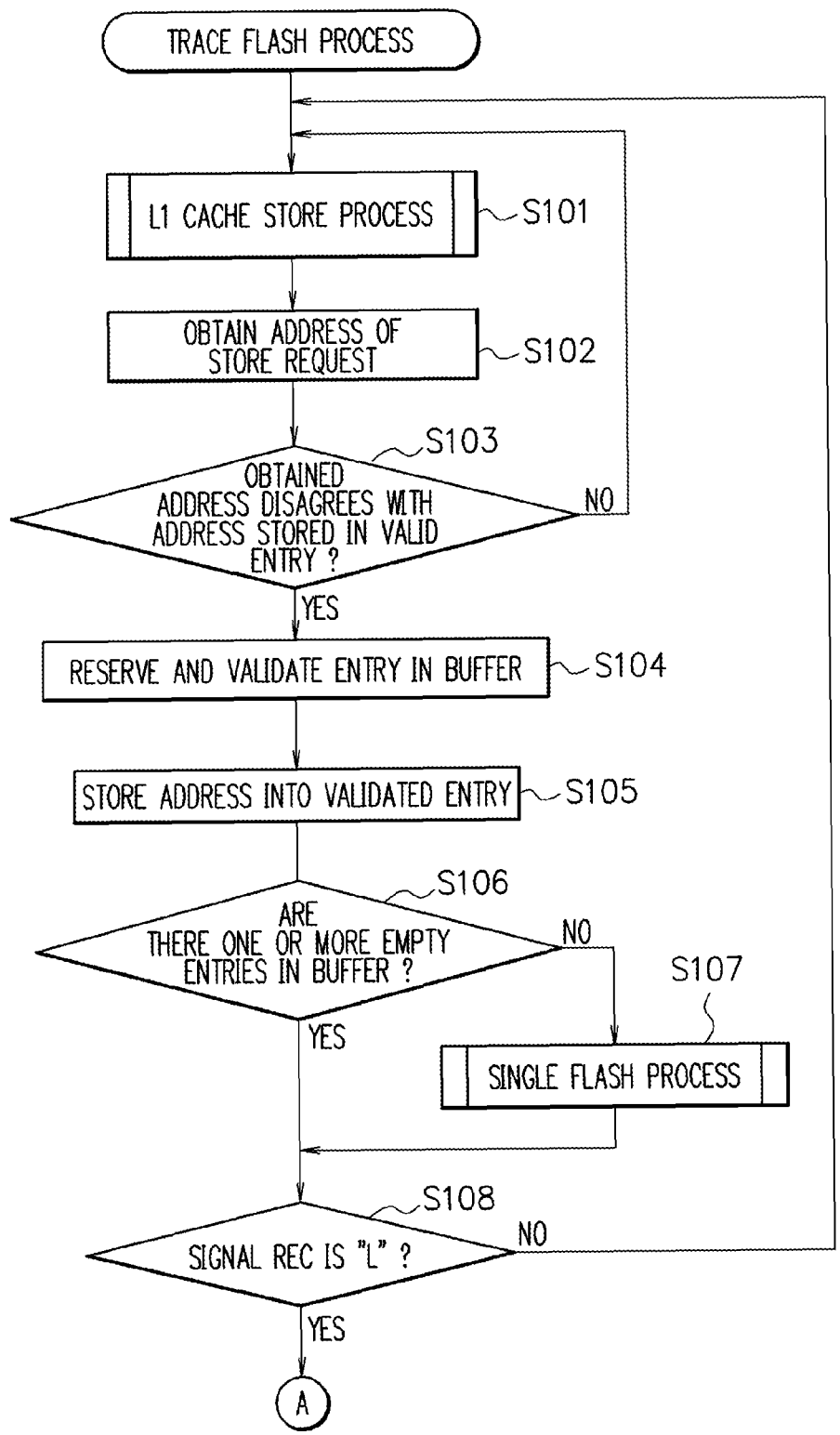

Next, the operation of the information processing apparatus in this embodiment will be described. FIG. 6A and FIG. 6B are flowcharts illustrating an example of the trace flash process in this embodiment. When it is indicated by the information S12 from the software that the present time is a period when to execute a store instruction for writing back data to the memory being the main storage from the cache memory by the trace flash process, the trace flash process in the information processing apparatus is started. When the signal REC output from the instruction control unit 112 is asserted, the buffer unit 114 detects the start of the store process for writing back the data to the memory 120 by the trace flash process.

First, the primary cache memory unit 113 executes the cache store process for writing the data to the primary cache memory 202 according to a store request from the instruction control unit 112 (S101). In the cache store process, as illustrated in FIG. 7, the pipeline processing unit 201 in the primary cache memory unit 113 receives the store request from the instruction control unit 112 (S201) to supply the store request to the pipeline (S202). Subsequently, the pipeline processing unit 201 outputs an address and the data of the store request to the primary cache memory 202 and writes the data into a storage area (entry) in the primary cache memory 202 corresponding to the address received by means of the store request (S203).

Back to FIG. 6A, the buffer control unit 203 of in buffer unit 114 obtains the address of the store request output from the pipeline processing unit 201 to the primary cache memory 202 in the cache store process at step S101 (S102). Next, the buffer control unit 203 compares the address obtained at step S102 and an address held in one or more valid entries in the buffer 204 to determine whether or not the obtained address is already stored in the valid entry in the buffer 204 (S103).

When it is determined as a result of the determination at step S103 that the obtained address is already in the valid entry in the buffer 204, the processing returns to step S101. On the other hand, when determining as a result of the determination at step S103 that the obtained address is not in the valid entry of the buffer 204, the buffer control unit 203 reserves an invalid entry in the buffer 204 based on the signal Iptr to validate the entry by controlling the valid bit of the entry (S104). Then, the buffer control unit 203 stores the address obtained at step S102 into the validated entry (S105).

Next, the buffer control unit 203 determines whether or not there are one or more empty entries in the buffer 204 (S106). When, as a result of the determination, there is not the empty entry in the buffer 204, that is, when all the entries are valid, the buffer control unit 203 executes a single flash process in order to invalidate one entry to bring the entry into a state having a vacancy (S107). The single flash process will be described in detail later, and one entry is invalidated by the execution of the single flash process.

Subsequently, the buffer control unit 203 determines whether or not the signal REC output from the instruction control unit 112 is negated (S108). When as a result of the determination, the signal REC is not negated, the processing returns to step S101. The above-described processes at steps S101 to S108 are repeatedly executed until the signal REC is negated, and when the signal REC is negated, the processing goes to step S109 illustrated in FIG. 6B. At step S109, the buffer control unit 203 receives the signal FLASH output from the instruction control unit 112.

Next, the buffer control unit 203 obtains the address stored in the valid entry in the buffer 204 based on the signal Optr (S110). Then, the buffer control unit 203 issues, to the secondary cache memory 115, a memory write-back request in which the address obtained at step S110 is designated as a write destination (S111). The secondary cache memory 115 executes the memory write-back process for writing the data to the memory 120, according to the memory write-back request from the buffer control unit 203.

In the memory write-back process, as illustrated in FIG. 9, the secondary cache memory 115 receives, from the primary cache memory unit 113, the memory write-back address where to write the data in the memory write-back process (S401). Next, the secondary cache memory 115 issues, to the primary cache memory 202, an acquisition request of the data indicated by the memory write-back address (S402), and receives a response thereto to obtain the data of the primary cache memory 202 (S403).

Subsequently, the secondary cache memory 115 updates the contents of the own memory by the data obtained at step S403 (S404), and further writes back the data to the memory 120 (S405). Then, when the write-back of the data obtained at step S403 to the memory 120 is completed, the memory 120 notifies a write-back end to the secondary cache memory 115. After receiving the write-back end from the memory 120 (S406), the secondary cache memory 115 notifies the write-back end to the primary cache memory 202 (S407) to end the memory write-back process. Here, in the trace flash process, at step S407, the secondary cache memory 115 notifies the write-back end also to the buffer unit 114 in addition to the primary cache memory 202.

Back to FIG. 6B, the buffer control unit 203 in the buffer unit 114 receives the write-back end from the secondary cache memory 115 (S113). Next, the buffer control unit 203 determines whether or not the memory write-back process is normally ended, based on the received write-back end (S114). When determining that the memory write-back process is normally ended, the buffer control unit 203 controls the valid bit of the entry in the buffer 204 from which the address is obtained at step S110, to invalidate this entry (S115).

Next, the buffer control unit 203 determines whether or not all the entries in the buffer 204 are invalid (S116), and when all the entries are invalid, it transmits a normal end (Normal END) to the software (S117), and ends the trace flash process. Consequently, it is possible to notify the software that, at the time of the write-back to the memory from the cache memory, the write-back is performed without any occurrence of an error in a transmission path between the CPU and the memory, or the like. On the other hand, when there is a valid entry in the buffer 204, the processing returns to step S110, and the above-described processes from step S110 are performed.

When determining that the memory write-back process is not normally ended, that is, erroneously ended, the buffer control unit 203 counts the number of error times (S118) to determine whether or not the number of error times is over a designated number of times (S119). When the number of error times is not over the designated number of times, the processing returns to step S111, and the buffer control unit 203 executes the processes from step S111 again by using the address obtained at step S110. On the other hand, when the number of error times is over the designated number of times, the buffer control unit 203 transmits an erroneous end (Error END) to the software (S120) to end the trace flash process. Consequently, it is possible to notify the software that at the time of the write-back from the cache memory to the memory, the write-back is not completed due to the occurrence of an error in the transmission path between the CPU and the memory, or the like.

FIG. 8 is a flowchart illustrating an example of the single flash process. In the single flash process, when all the entries in the buffer 204 become valid, the memory write-back process for one entry is executed and this entry is invalidated.

When the single flash process is started, the buffer control unit 203 outputs, to the pipeline processing unit 201 in the primary cache memory unit 113, a store inhibition signal for stopping the supply of the store request to the pipeline, thereby inhibiting the subsequent store process (S301). Next, the buffer control unit 203 obtains an address stored in the valid entry in the buffer 204 based on the signal Optr (S302). Then, the buffer control unit 203 issues, to the secondary cache memory 115, a memory write-back request in which the address obtained at step S302 is designated as a write destination (S303).

The secondary cache memory 115 executes a memory write-back process for writing data into the memory, according to the memory write-back request from the buffer control unit 203 (S304). Note that the memory write-back process at step S304 is the same as the memory write-back process at step S112 in FIG. 6B. Subsequently, the buffer control unit 203 receives a write-back end from the secondary cache memory 115 (S305). Next, the buffer control unit 203 controls the valid bit of the entry in the buffer 204 from which the address is obtained at step S302, to invalidate this entry (S306) and ends the processing.

Figure 10:
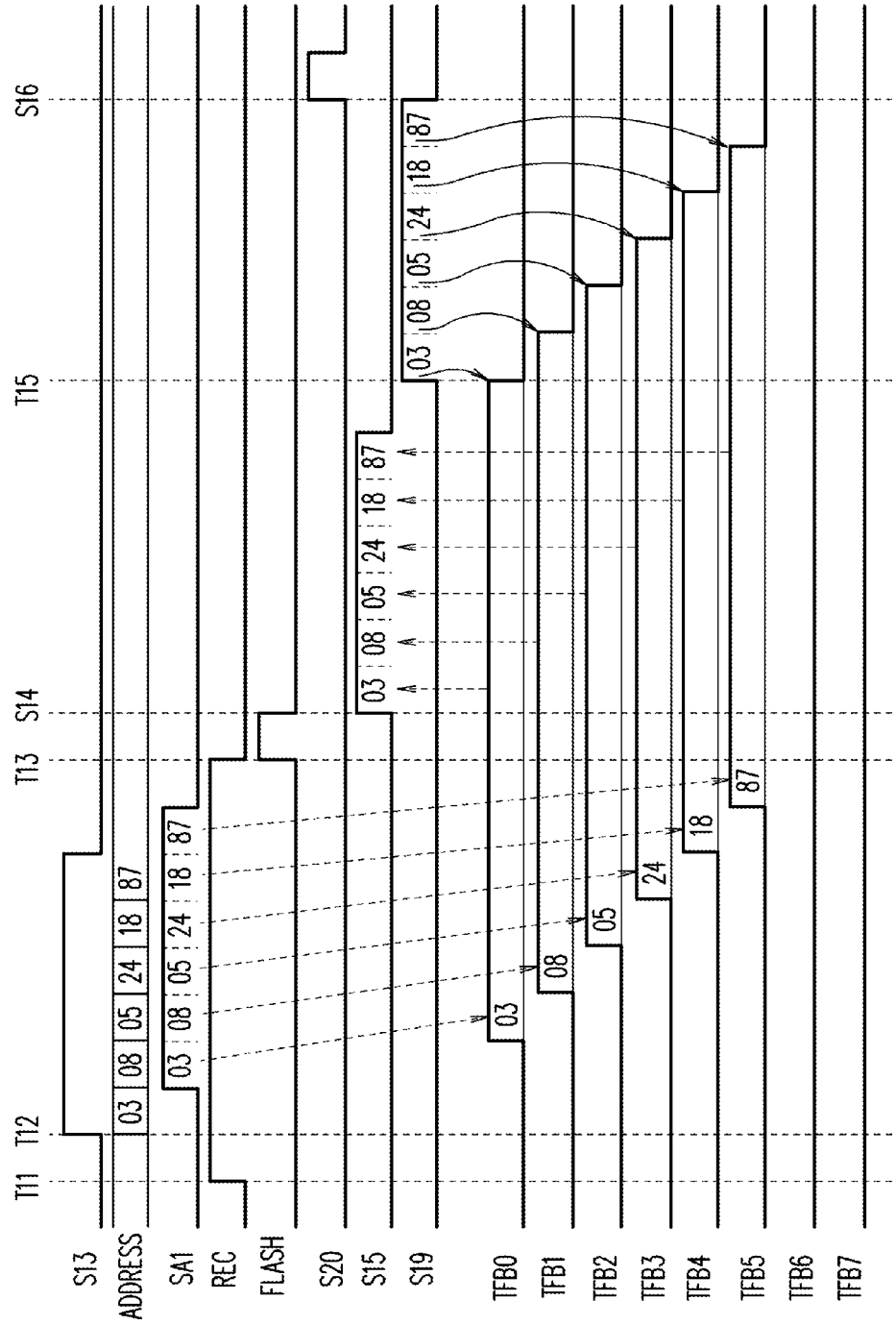
FIG. 10 and FIG. 11 are timing charts illustrating an operation example of the information processing apparatus in this embodiment.

FIG. 10 is a timing chart illustrating an operation example of the information processing apparatus in this embodiment and illustrates the case where the data write-back to the memory 120 is normally ended in the trace flash process. The instruction control unit 112 asserts the signal REC according to the information S12 from the software (time T11). Thereafter, from time T12, according to the store instruction from the software, the instruction control unit 112 sequentially outputs the store requests S13 and addresses of the store requests regarding a series of data (not shown) that are to be written to the memory 120 by the trace flash process.

Upon receiving the store requests S13 and the addresses of the store requests which are sequentially output from the instruction control unit 112, the pipeline processing unit 201 in the primary cache memory unit 113 outputs the addresses SA1 of the store requests to the primary cache memory 202. At this time, since the signal REC is asserted, the buffer control unit 203 in the buffer unit 114 obtains the addresses SA1 of the store requests output to the primary cache memory 202 to register and hold them in the entries (TFB0 to TFB7) 301-0 to 301-7 in the buffer unit 204. In the example illustrated in FIG. 10, the number of the series of data that are to be written to the memory 120 by the trace flash process is six, and therefore, the addresses SA1 of the store requests are held in the entries (TFB0 to TFB5) 301-1 to 301-5.

At time T13, the instruction control unit 112 negates the signal REC according to the information S12 from the software and asserts the signal FLASH. At time T14 after the signal FLASH is asserted, the buffer control unit 203 in the buffer unit 114 sequentially issues, to the secondary cache memory 115, the memory write-back requests S15 regarding the addresses of the store requests stored in the entries (TFB0 to TFB5) 301-0 to 301-5 in the buffer 204.

Then, when the write-back processes of the data regarding the addresses of the respective store requests to the memory 120 are ended, the secondary cache memory 115 sequentially notifies the write-back ends S19 of the data regarding the addresses to the buffer unit 114 (time T15). The buffer control unit 203 receiving the write-back ends S19 of the data invalidates the entries (TFB0 to TFB7) 301-0 to 301-7 in the buffer 204 where the addresses of the store requests are stored. Then, at time T16 after all the write-back ends S19 corresponding to the valid entries in the buffer 204 are received, the buffer unit 114 outputs the end (Normal END) S20 of the trace flash process to the software, and the processing is completed.

Figure 11:
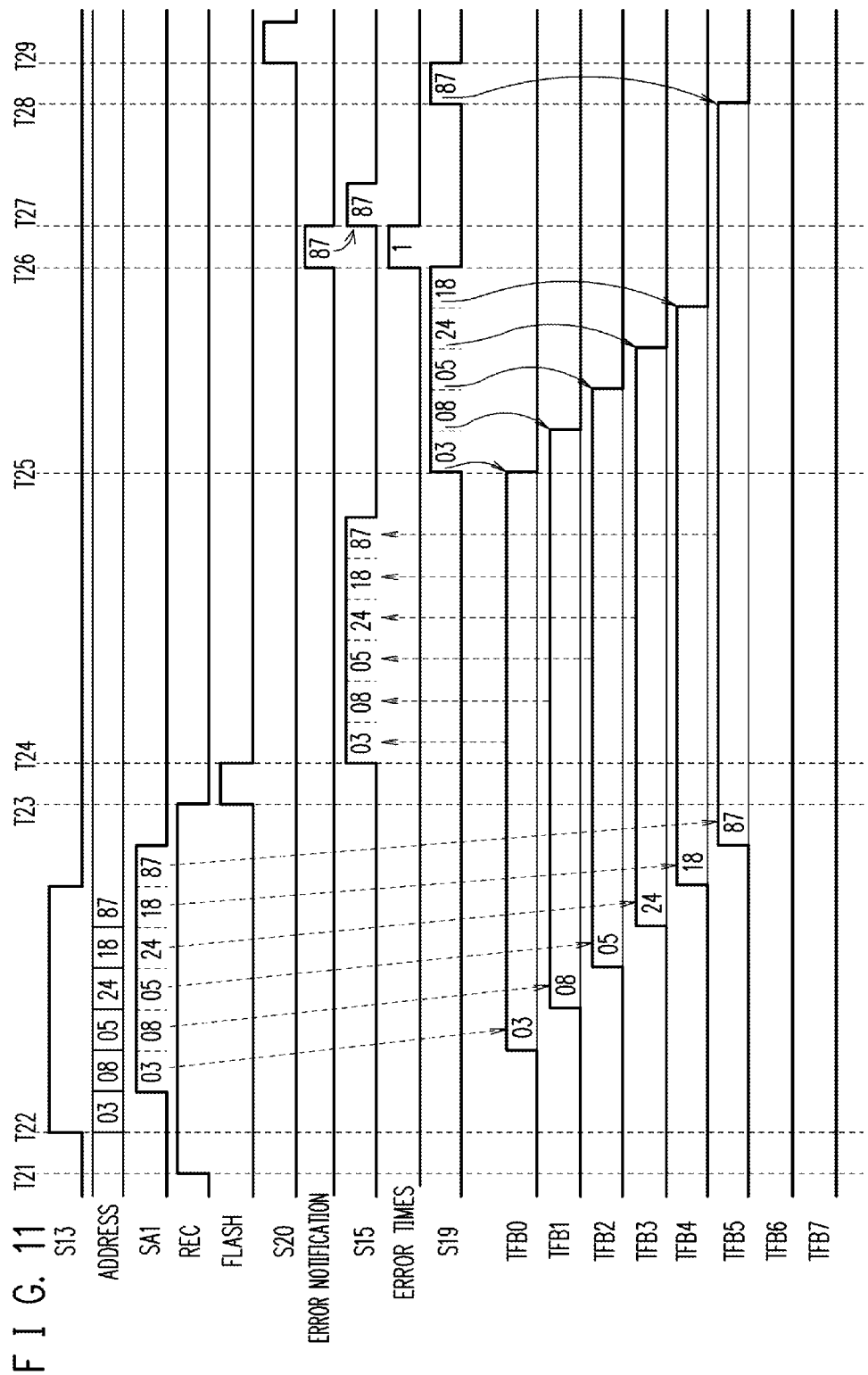

FIG. 11 is a timing chart illustrating an operation example of the information processing apparatus in this embodiment and illustrates the case where an error occurs in the data write-back to the memory 120 in the trace flash process and the data write-back is performed again. Since the operations from time T21 to time T25 illustrated in FIG. 11 are the same as the operations from the time T11 to the time T15 illustrated in FIG. 10, a description thereof will be omitted.

In the example illustrated in FIG. 11, the first write-back process of data regarding an address "87" of a store request to the memory 120 is erroneously ended, and at T26, the secondary cache memory 115 notifies a write-back error to the buffer unit 114. Upon receiving this notification, the buffer unit 114 issues the memory write-back request S15 regarding the address "87" of the store request again to the secondary cache memory 115 (time T27). Then, when the write-back process of the data regarding the address "87" of the store request to the memory 120 is normally ended, the secondary cache memory 115 notifies the write-back end S19 to the buffer unit 114 (time T28).

The buffer control unit 203 receiving the write-back end S19 of the data regarding the address "87" of the store request invalidates the entry (TFB5) 301-5 in the buffer 204 where the address "87" of the store request is stored. Then, at time T29, the buffer unit 114 outputs the end (Normal END) S20 of the trace flash process to the software, and the processing is completed.

Figure 12:
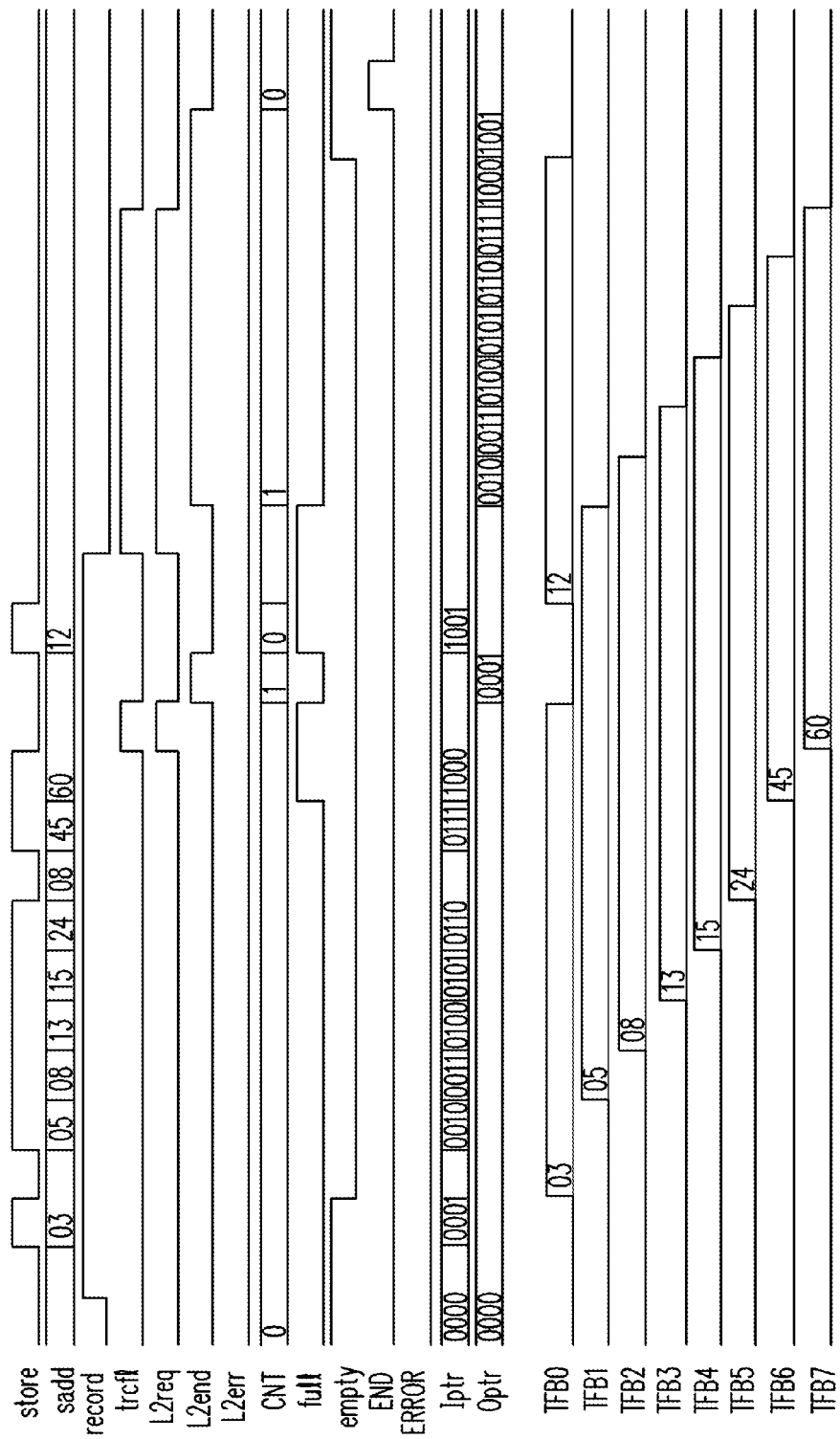
Figure 14:
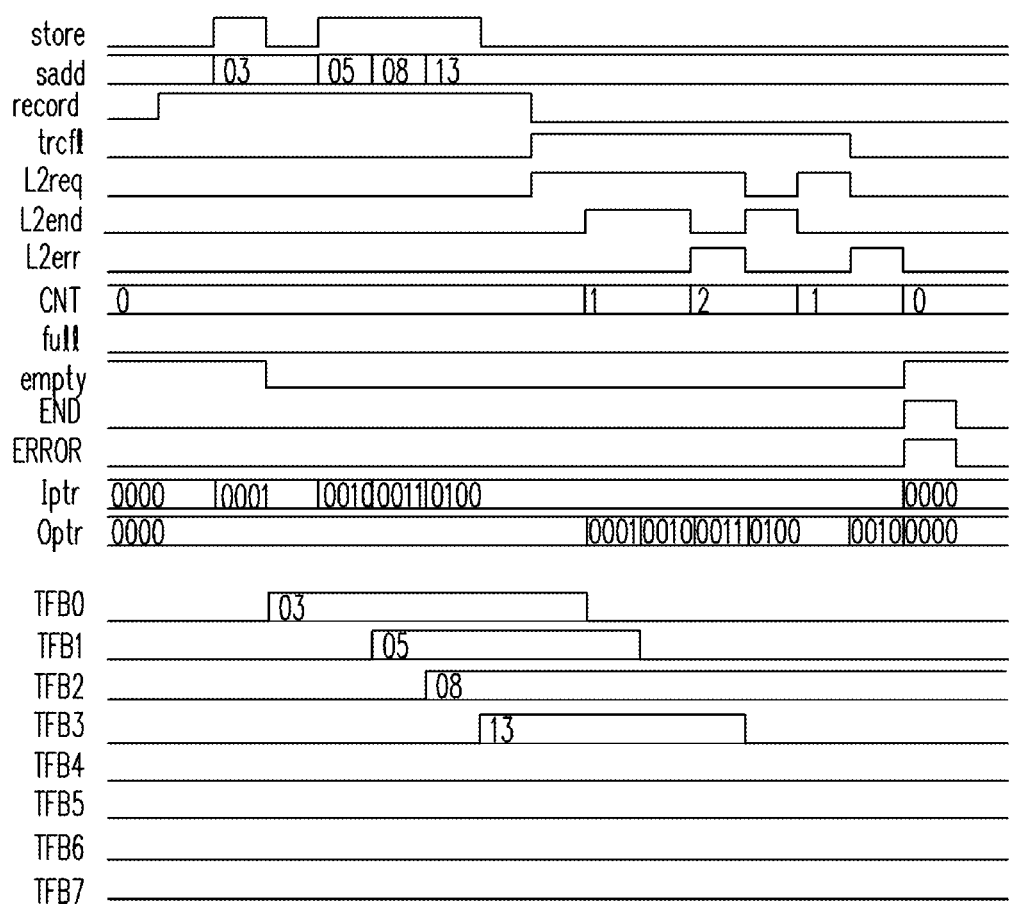

FIG. 12, FIG. 13, and FIG. 14 are timing charts illustrating operation examples of the buffer unit 114 in this embodiment. Out of signals illustrated in FIG. 12 to FIG. 14, those corresponding to the signals illustrated in FIG. 3 are denoted by the same signal names. In FIG. 12 to FIG. 14, CNT is a count value of the counter 332 and TFBi (i=0 to 7) represents a valid address held in the entry (TFBi) 301-i in the buffer 204.

FIG. 12 illustrates an example where the number of a series of data that are to be written back to the memory 120 by the trace flash process is nine. When values of the most significant bits of the signals Iptr, Optr are different and values of their less significant three bits are the same, the signal full indicating a full state that all the entries are valid is asserted. Further, when the values of the signals Iptr, Optr are the same, the signal empty indicating an empty state that all the entries are invalid is asserted.

The signal record is asserted and the store process of the series of data that are to be written to the memory 120 by the trace flash process is started. When, in the state where the signal record is asserted, the signal store indicating that the cache store process for writing the data to the primary cache memory is to be performed is asserted and the signal sadd corresponding to an address of the store request is input, the entry (TFBi) 301-i in the buffer 204 indicated by the value i of the less significant three bits of the signal Iptr holds a value of the signal sadd. Further, the buffer control unit 203 increments the value of the signal Iptr by 1.

Incidentally, even if the signal store is asserted in the state where the signal record is asserted, the value of the signal sadd is not held when the signal full is asserted or when the value of the signal sadd is the same as a value already held in the entry ("08" at the second time in the example illustrated in FIG. 12). Further, even in the state where the signal record is asserted, the value of the signal sadd is not held when the signal store is negated.

Then, when the values of the most significant bits of the signals Iptr, Optr become different and the values of their less significant three bits become the same, the signal full is asserted. Further, the signal L2req which indicates that the subsequent store process is inhibited and the data write-back is requested to the secondary cache memory and the signal trcfl which is asserted when the memory write-back process is requested are asserted. Consequently, the buffer control unit 203 executes the memory write-back process of data regarding the address stored in the entry (TFBi) 301-i in the buffer 204 indicated by the value i of the less significant three bits of the signal Optr, and invalidates the entry (TFBi) 301-i. In the example illustrated in FIG. 12, a memory write-back process of data regarding an address "03" stored in the entry (TFB0) 301-0 in the buffer 204 is executed, and the entry (TFB0) 301-0 is invalidated.

Further, when executing the memory write-back process of the data, the buffer control unit 203 increments the value of the signal Optr by 1 and increments the count value CNT of the counter 332 by 1. Then, when the memory write-back process of the data is normally ended, the secondary cache memory asserts the signal L2end indicating that the write-back to the memory is normally ended, and the buffer control unit 203 decrements the count value CNT of the counter 332 by 1.

When the values of the signals Iptr, Optr become different again, the signal full is negated, and the signal store is asserted, the entry (TFBi) 301-i in the buffer 204 indicated by the value i of the less significant three bits of the signal Iptr holds a value of the signal sadd corresponding to an address of the store request. Further, the buffer control unit 203 increments the value of the signal Iptr by 1.

Thereafter, when the store process of the series of data that are to be written to the memory 120 by the trace flash process is ended, the signal record is negated. Then, when the signals L2req and trcfl are asserted, the buffer control unit 203 executes the memory write-back process of data regarding the addresses stored in the entries (TFBi) 301-i in the buffer 204 until the values of the signals Iptr, Optr become the same. When executing the memory write-back process of the data, the buffer control unit 203 performs a count operation by using the counter 332, and when the count value CNT is 0 at the end of the write-back of the data by the trace flash process, the buffer control unit 203 outputs the signal END indicating that the trace flash process is normally ended.

FIG. 13 illustrates an example where an error occurs once in the write-back to the memory 120 in the trace flash process and the write-back is performed again by hardware.

When the entries (TFBi) 301-i in the buffer 204 in the buffer unit 114 hold the values of the signal sadd and the store process of a series of data that are to be written to the memory 120 by the trace flash process is ended as in the operation example illustrated in FIG. 12, the signal record is negated. Then, when the signals L2req and trcf2 are asserted, the buffer control unit 203 executes the memory write-back process of the data regarding addresses stored in the entries (TFBi) 301-i in the buffer 204 until the values of the signals Iptr, Optr become the same. In this memory write-back process, in the example illustrated in FIG. 13, an error occurs when data regarding an address "08" stored in the entry (TFB2) 301-2 in the buffer 204 is written back to the memory, and the signal L2err from the secondary cache memory 115 is asserted.

When the values of the signals Iptr, Optr become the same, the buffer control unit 203 changes the value of the signal Optr from "0100" to "0010" which is a value when the error occurs at the time of the write-back of the data to the memory. Consequently, the buffer control unit 203 executes again the memory write-back process of the data regarding the address "08" stored in the entry (TFB2) 301-2 indicated by the signal Optr. When this memory write-back process is normally ended and the signal L2end is asserted, the buffer control unit 203 decrements the count value CNT of the counter 332 by 1, so that the count value becomes 0. Further, the buffer control unit 203 returns the value of the signal Otpr to "0100". Then, the buffer control unit 203 outputs the signal END indicating that the trace flash process is normally ended.

FIG. 14 illustrates an example where an error of the write-back to the memory 120 occurs twice in the trace flash process and the errors are notified to the software. The operations up to the time when the first error occurs at the time of the write-back of the data to the memory and the write-back process of the data to the memory is executed again are the same as those of the example illustrated in FIG. 13. However, in the example illustrated in FIG. 14, the error occurs also in the memory write-back process executed again and the signal L2err from the secondary cache memory 115 is asserted. When the error thus occurs again in the memory write-back process regarding the same address, the buffer control unit 203 outputs, to the software, the signal ERROR indicating that the trace flash process is erroneously ended. Further, the buffer control unit 203 sets the signals Iptr, Optr, the count value CNT of the counter 332, and values held by the entries (TFBi) 301-i in the buffer 204 to initial values (for example, 0).

According to this embodiment, by the trace flash process, it is possible to quickly execute the write-back to the memory 120 after certain data is written to the primary cache memory 202, which may ensure safety of the storage of the certain data. Therefore, for example, when a certain CPU fails, data is written back to the memory 120 from the primary cache memory of this CPU, which may prevent a plurality of CPUs from being influenced and enables continuous use of the information processing apparatus. Further, even if the CPU fails at the time of the write-back of data from the primary cache memory 202 to the memory 120, data before the failure is in the memory 120, and therefore, by executing the processing only of the CPU having the failure, it is possible to continuously use the information processing apparatus. Further, regarding certain data, the data is quickly written back to the memory 120 from the primary cache memory 202 and data such as results in the course of calculation are not written back by the trace flash process, so that performance is not deteriorated.

In an information processing apparatus in which a plurality of processors share a memory as a main storage, after certain data is written to a cache memory of the processor, the certain data written to the cache memory may be quickly written back to the main storage.

All examples and conditional language provided herein are intended for the pedagogical purposes of aiding the reader in understanding the invention and the concepts contributed by the inventor to furthering the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processor comprising:
a cache memory;
an instruction control unit that issues a store request for writing data to the cache memory and respectively outputs a first signal and a second signal, wherein the instruction control unit asserts the first signal when an output of the store request regarding certain data is started and negates the first signal when the output of the store request regarding the certain data is ended, and asserts the second signal when the output of the store request regarding the certain data is ended;
a first write processing unit that, upon receiving the store request from the instruction control unit, outputs an address and data of the store request to the cache memory to write the data to the cache memory;
a buffer unit that includes a plurality of entries, and when the first signal is asserted, obtains the address output to the cache memory from the first write processing unit to hold the obtained address in an entry out of the plurality of entries, and when the second signal is asserted, issues a write-back request for writing, to a main storage, the data indicated by the address held in the entry; and
a second write processing unit that, upon receiving the write-back request from the buffer unit, obtains the data corresponding to the write-back request from the cache memory to write the obtained data to the main storage.

2. The processor according to claim 1, wherein, when no vacancy is left in the plurality of entries during the first signal is asserted, the buffer unit issues the write-back request of the data indicated by the address held in the entry.

3. The processor according to claim 1, wherein when the obtained address and an address already held in the entry are the same, the buffer unit does not perform an operation for holding the obtained address.

4. The processor according to claim 1, wherein the buffer unit notifies a normal end when the write of the data to the main storage executed in response to the issued write-back request is normally ended.

5. The processor according to claim 1, wherein, when an error occurs in the write of the data to the main storage executed in response to the issued write-back request, the buffer unit issues the write-back request of the data in whose write the error occurs.

6. The processor according to claim 5, wherein the buffer unit counts the number of times the error occurs in the write of the data to the main storage executed in response to the issued write-back request, and when the number of times the error occurs is over a designated number of times, performs an error notification.

7. An information processing apparatus comprising:
a plurality of processors each of which performs arithmetic processing; and
a main storage connected to the plurality of processors, the plurality of processors each comprising:
a cache memory;
an instruction control unit that issues a store request for writing data to the cache memory and respectively outputs a first signal and a second signal, wherein the instruction control unit asserts the first signal when an output of the store request regarding certain data is started and negates the first signal when the output of the store request regarding the certain data is ended, and asserts the second signal when the output of the store request regarding the certain data is ended;
a first write processing unit that, upon receiving the store request from the instruction control unit, outputs an address and data of the store request to the cache memory to write the data to the cache memory;
a buffer unit that includes a plurality of entries, and when the first signal is asserted, obtains the address output to the cache memory from the first write processing unit to hold the obtained address in an entry out of the plurality of entries, and when the second signal is asserted, issues a write-back request for writing, to a main storage, the data indicated by the address held in the entry; and
a second write processing unit that, upon receiving the write-back request from the buffer unit, obtains the data corresponding to the write-back request from the cache memory to write the obtained data to the main storage.

8. A control method of a processor comprising:

issuing, by an instruction control unit of the processor, a store request for writing data to a cache memory;

asserting a first signal, by the instruction control unit of the processor, wherein the instruction control unit asserts the first signal when an output of the store request regarding certain data is started and negates the first signal when the output of the store request regarding the certain data is ended;

outputting, by a first write processing unit of the processor, an address and data of the store request to write the data to the cache memory upon receiving the store request from the instruction control unit;

obtaining, by a buffer unit of the processor, the address output to the cache memory from the first write processing unit to hold the obtained address in an entry when the first signal is asserted;

issuing, by the buffer unit of the processor, a write-back request for writing the data indicated by the address held in the entry to a main storage when a second signal is asserted by the instruction control unit of the processor, wherein the instruction control unit asserts the second signal when the output of the store request regarding the certain data is ended; and obtaining, by a second write processing unit of the processor, the data corresponding to the write-back request from the cache memory to write the obtained data to the main storage, upon receiving the write-back request from the buffer unit.

9. The processor according to claim 1, wherein, according to a store instruction of the certain data from software, the instruction control unit issues the store request and asserts to output the first signal.

10. The processor according to claim 1, wherein, according to an instruction from software, the instruction control unit negates to output the first signal and asserts to output the second signal.

* * * * *